United States Patent Office 3,404,005
Patented Oct. 1, 1968

3,404,005
DIAZO LIGHT-SENSITIVE COMPOSITION
AND ELEMENT
Paul L. Tobey, Rehoboth, Mass., assignor to Industrial Dyestuff Company, East Providence, R.I., a corporation of Rhode Island
No Drawing. Filed Oct. 1, 1963, Ser. No. 312,886
3 Claims. (Cl. 96—91)

This invention relates to a novel diazotype, light-sensitive media and to a novel component compound for use in such a media.

The light sensitive diazotype process has been known in the art for many years. This process is based upon the fact that exposure to light causes diazonium salts to undergo photochemical changes which effect their capacity to form dyes. Dyes are formed when diazonium compounds couple with a coupling component in a suitable medium. During exposure to light the diazonium compound undergoes decomposition and is thus rendered incapable of coupling and dye formation.

Many coupling components have been utilized in the past; however, few have been found that produce a blue image which meets the rigid requirements of the diazotype art.

One disadvantage in using many known couplers is that sufficient resistance to precoupling or dye formation is not accomplished. Therefore, when the coupler is combined with a diazo component on a suitable base the resulting light-sensitive media does not possess sufficient storage stability due to its precoupling tendency. Another shortcoming of many of these known coupler components is their facility to oxidize and thus discolor the base to a darkened background resulting in unclearly defined images.

Evidence of these deficiencies are found disclosed in various U.S. patents. For example, U.S. Patent No. 2,196,950 teaches that in a diazo system derivates of mono or dihydroxynaphthalene and more particularly 2,3-dihydroxynaphthalene yield blue images. However, U.S. Patent No. 2,487,034 states that these couplers do not have sufficient resistance to precoupling to make the product commercially valuable. It further states that the use of 2,7-dihydroxynaphthalene, 1,5-dihydroxynaphthalene, 1,8-dihydroxynaphthalene and certain of their sulfonic acids, as coupling components, impart a dark background to the prints as the result of oxidation. Accordingly, the prints thus obtained are unattractive since the images thereby produced are not clearly defined upon a clean white base.

A still further disadvantage in using other known coupling components is that many possess the property of being quite soluble in water. Such a characteristic is highly undesirable since these couplers would then impart a degree of water "bleed" to the dye image when utilized in the diazo process. For instance, in German Patent No. 896,453, hydroxyalkylamides of 2-hydroxy-3-naphthoic acid are disclosed as couplers. The solubility of these types in water and aqueous alcohol media is pointed out and attention is called to the need to keep the molecular weight of the oxyalkyl group low to retain this solubility. Loss of water solubility would require the use of organic solvents such as alcohols, thereby complicating the coating operation.

This present invention contemplates a novel light-sensitive diazo type material comprising a diazo component and a an amide derivative of a 2-hydroxy-3-naphthoic acid.

Further, this invention contemplates the use of a specific coupling component with a light-sensitive diazo media. The couplers which can be used according to this invention consists of a compound having the general formula

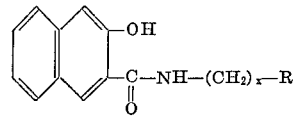

wherein $x$ equals 2 to 4 and R is a piperidyl, morpholinyl or piperazinyl group.

Typical coupler compounds include:

(a) N-piperidyl ethyl-$\alpha$(o-hydroxy-naphthyl) amide (b) N-morpholinyl ethyl-$\alpha$(o-hydroxy-naphthyl) amide (c) N-piperazinyl ethyl-$\alpha$(o-hydroxy-naphthyl) amide (d) N-piperidyl propyl-$\alpha$(o-hydroxy-naphthyl) amide (e) N-morpholinyl propyl-$\alpha$(o-hydroxy-naphthyl) amide (f) N-piperazinyl propyl-$\alpha$(o-hydroxy-naphthyl) amide The use of these specific coupling components not only results in improving the blue shade of the dye system but also results in producing diazo type images which are clear and fast to light, storage, moisture and washing. The novel couplers further minimize undesirable water "bleeding" since the couplers themselves are insoluble in water. Further, no need is necessitated for utilizing a highly volatile organic solvent to bring the insoluble coupler into solution, for facilitating the spreading of the light sensitive diazo media on a base, since the novel couplers of this invention are soluble in dilute acids.

In practice a base such as paper, cloth, film or the like is coated with a sensitizing composition containing a diazo compound, exposed to light through a pattern and developed by treating under appropriate conditions with a coupling component which can react with the undestroyed diazo compound to give a dye image of the pattern. Alternately, the base may be coated with a formulation containing both the light sensitive diazo and the coupling component. The coated base, which can be handled in subdued daylight, is placed beneath a pattern or tracing and exposed to light. The exposed portions become bleached while the unexposed portions retain their coloring. After exposure, the base is passed over a tank of ammonia vapors which converts the unexposed portions to a dye image. Many variations of the above described processes are practiced by those skilled in the art.

The light-sensitive diazo portion of the coating formula may be any of those suitable for use in the diazotype art. Examples of the useful types are the diazonium compounds of:

4-amino phenyl morpholine;
4-amino 2,5 diethoxy phenyl morpholine;
4-amino 2,5-dimethoxy phenyl morpholine;
4-amino-N-methylaniline;
4-amino-N-ethylaniline;
4-amino-diphenylamine;
4-amino-N-(β-hydroxyethyl) aniline;
4-amino-N-(2,6-dibromobenzyl) aniline;
4-amino-N,N-dimethylaniline;
4-amino-N,N-diethylaniline;
4-amino-N,N-dipropyl aniline;
4-amino-N-methyl-N-(β-hydroxyethyl) aniline;
4-amino-N-ethyl-N-(β-hydroxyethyl) aniline;
4-amino-N-butyl-N-(β-hydroxyethyl) aniline;
4-amino-N,N-di(β-hydroxyethyl) aniline;
4-amino-N-benzyl-N-ethylaniline;
4-amino-N-ethyl-3-methylaniline;
4-amino-N,N-dimethyl-3-methylaniline;
4-amino-N,N-dimethyl-2-methylaniline;
4-amino-N,N-diethyl-3-methylaniline;
4-amino-N-ethyl-N-(β-hydroxyethyl)3-methylaniline;
4-amino-N-cyclohexyl-2-methoxyaniline;
4-amino-N,N-di(β-hydroxyethyl)3-methoxyaniline;
4-amino-N,N-diethylamino-3-ethoxyaniline;
4-amino-3-chloro-N,N-di(β-hydroxyethyl) aniline;
4-amino-3-carboxy-N,N-diethylaniline;
1-amino-2-hydroxynaphthalene-4-sulfonic acid;
2-amino-1-hydroxynaphthalene-5-sulfonic acid;
2-amino-1-hydroxynaphthalene-3,6-disulfonic acid;
3-aminocarbazol, and the like.

These diazo compounds are used in the form of their stabilized salts, as exemplified by p-diphenylamine diazonium sulfate or in the form of their zinc chloride or boron trifluoride double salts. As examples of such stabilized double salts, there may be mentioned the zinc chloride or boron trifluoride double salts of:

p-Diethylaminobenzenediazonium chloride;
p-Di-(β-hydroxyethyl)amino-2-methylbenzenediazonium chloride;
p-Ethyl-(β-hydroxyethyl) aminobenzenediazonium chloride;
p-Diethylamino-3-ethoxybenzenediazonium chloride, and the like.

The diazo compounds may also be used in the form of an anhydride, as exemplified by:

2-amino-1-hydroxynaphthalene-4-sulfodiazonium anhydride;
2-amino-1-hydroxynaphthalene-5-sulfodiazonium anhydride;
1-amino-2-hydroxynaphthalene-4-sulfodiazonium anhydride;
1-amino-2-hydroxynaphthalene-5-sulfodiazonium anhydride and their water soluble alkali metal salts.

In formulating compositions for a two-component diazotype material in addition to the light-sensitive diazo and coupler, use is made of acidic stabilizers as well as other additives intended to inhibit precoupling and/or to speed up the image development of the exposed material. Such acid stabilizers may include citric acid, phosphoric acid, boric acid and the like.

The compositions of the formulations containing these novel couplers can be varied by those trained in the diazotype art to suit the base to be coated and the type of coating equipment to be utilized. The coating composition, when properly formulated, may be applied to cellulosic material as well as to polyamides, polyesters and the like as well as to paper and to cloth already previously mentioned.

The coupling components of this invention may be prepared by a variety of methods including the reaction of 2-hydroxy-3-naphthoic acid or its acid chloride with the appropriate amine. Alternatively, esters of the above-mentioned acid may be reacted directly with the appropriate amine to give the amide.

The following examples illustrate the preparation of the novel coupling components:

EXAMPLE 1

202 g. of 2-hydroxy-3-naphthoic acid methylester in 50 cc. methanol is reacted with an excess of N-(aminoethyl) piperazine at 50–80° C. When the reaction is completed the reaction mixture is diluted with water and neutralized with hydrochloric acid. The product is

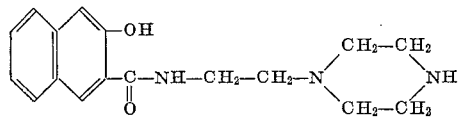

and has a melting point of 275–280° C.

EXAMPLE 2

Using the process of Example 1 N-(aminoethyl)morpholine in place of N-(aminoethyl)piperazine, a product of the structure

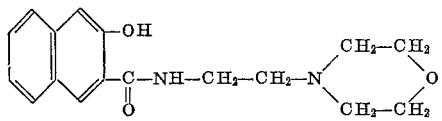

is obtained with a melting point of 201–205° C.

EXAMPLE 3

Using the process of Example 1 and N-(aminoethyl) piperidine in place of N(aminoethyl)piperazine, a product of the structure

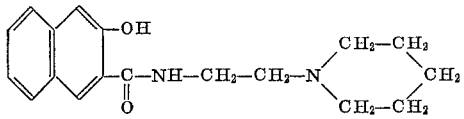

is obtained with a melting point of 221–226° C.

EXAMPLE 4

Using the process of Example 1 and N-(aminopropyl) piperazine in place of N-(aminoethyl)piperazine, a product of the structure

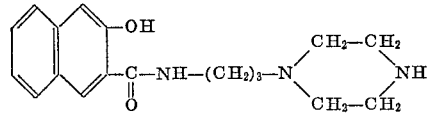

is obtained with a melting point of 242–248° C.

EXAMPLE 5

Using the process of Example 1 and N-(aminopropyl) morpholine in place of N-(aminoethyl)piperazine, a product of the structure

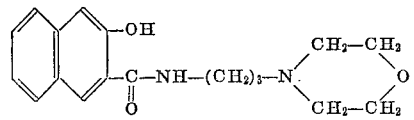

is obtained with a melting point of 143–147° C.

EXAMPLE 6

Using the process of Example 1 and N-(aminopropyl) piperidine in place of N-(aminoethyl)piperazine, a product of the structure

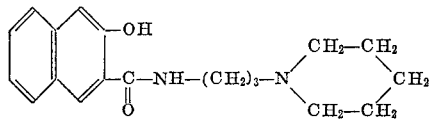

is obtained with a melting point of 207–211° C.

The novel diazotype solutions incorporating the novel couplers may be prepared according to the following examples:

EXAMPLE 7

| | Parts |
|---|---|
| p-Dimethylaminoaniline diazo zinc chloride salt | 2.5 |
| Product from Example 5 | 0.5 |
| Acetic acid | 0.5 |
| Citric acid | 8.0 |
| Thiourea | 4.0 |
| Zinc chloride | 4.0 |
| Water | 100.0 |

A suitable base, such as paper, cellulose acetate film, etc. is coated with the above solution. When this product is exposed to light through a pattern, and developed by treatment with an alkali such as ammonia vapor, sodium carbonate solution, etc. a bright blue image of outstanding permanence to light and washing is formed.

EXAMPLE 8

Using the prodedure described in Example 7 but substituting N-hydroxyethyl, N-methylaniline-p-diazo zinc chloride salt for the diazo listed therein, a darker image is produced.

EXAMPLE 9

Using the procedure described in Example 7 but substituting N-(4-amino 2,5-dimethoxy phenyl) morpholine diazo zinc chloride for the diazo cited therein, a clear blue image is formed.

EXAMPLE 10

Using the procedure described in Example 7 but substituting the product from Example 1 for the coupler component cited therein, a bright blue image is produced.

Many modifications of these examples demonstrating the use of many couplers will be evident to those skilled in the diazotype art.

I claim:

1. Light-sensitive diazotype composition comprising as a coupler component as amide of the formula

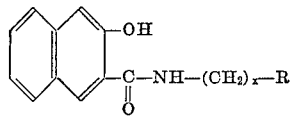

wherein $x$ equals 2 to 4 and R is a group consisting of

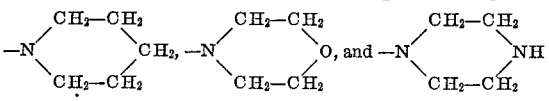

and at least one light-sensitive compound selected from the group consisting of a secondary para aminobenzene diazonium salt and a tertiary para aminobenzene diazonium salt.

2. Light-sensitive diazotype composition comprising as a coupler component an amide of the formula

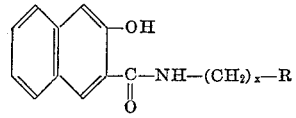

wherein $x$ equals 2 to 4 and R is

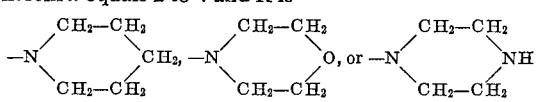

3. A light-sensitive diazotype article comprising a base coated with a light-sensitive composition including a coupler component having the following general formula:

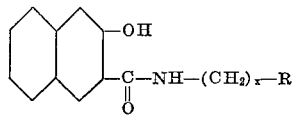

wherein $x$ equals 2 to 4 and R is a group consisting of

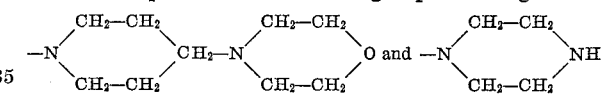

and a light-sensitive p-aminobenzene diazonium salt.

References Cited

UNITED STATES PATENTS

| | | | |
|---|---|---|---|
| 2,233,038 | 2/1941 | Sus et al. | 96—91 |
| 2,489,950 | 11/1949 | Blicke | 260—268 |
| 2,688,026 | 8/1954 | Krimmel | 260—268 |
| 2,792,303 | 5/1957 | Sanders et al. | 96—91 X |
| 3,028,240 | 4/1962 | Werner et al. | 96—91 |
| 3,043,827 | 7/1962 | Straley et al. | 260—560 X |
| 3,079,374 | 2/1953 | Straley et al. | 260—560 X |
| 3,079,375 | 2/1963 | Straley et al. | 260—560 X |
| 3,139,341 | 6/1964 | Schlesinger | 96—91 |
| 3,207,748 | 9/1965 | Bossard et al. | 260—560 X |
| 3,064,049 | 11/1962 | Cox | 96—91 X |
| 3,255,010 | 6/1966 | Sus et al. | 96—91 X |

NORMAN G. TORCHIN, *Primary Examiner.*

C. L. BOWERS, JR., *Assistant Examiner.*

UNITED STATES PATENT OFFICE
CERTIFICATE OF CORRECTION

Patent No. 3,404,005                                                         October 1, 1968

Paul L. Tobey

It is certified that error appears in the above identified patent and that said Letters Patent are hereby corrected as shown below:

Column 1, line 71, "with" should read -- within --. Column 5, line 18, "0.5" should read -- 1.0 --; line 51, "as" should read -- an --. Column 6, line 23, after the formula, insert -- and a p-aminobenze diazonium salt --; line 48, "1953" should read -- 1963 --.

Signed and sealed this 10th day of March 1970.

(SEAL)
Attest:

Edward M. Fletcher, Jr.                              WILLIAM E. SCHUYLER, JR.
Attesting Officer                                             Commissioner of Patents